United States Patent
Kosseifi et al.

(10) Patent No.: US 9,788,146 B2
(45) Date of Patent: Oct. 10, 2017

(54) PROCESSING AND DISPLAY OF LOCATION BASED MESSAGES FOR MOBILE DEVICES

(71) Applicants: AT&T Mobility II LLC, Atlanta, GA (US); AT&T Intellectual Property I, LP, Atlanta, GA (US)

(72) Inventors: Mario Kosseifi, Roswell, GA (US); Mark Austin, Rosewell, GA (US); Kristopher Van De Steeg, Bridgeton, MO (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 552 days.

(21) Appl. No.: 14/100,582

(22) Filed: Dec. 9, 2013

(65) Prior Publication Data
US 2015/0163623 A1    Jun. 11, 2015

(51) Int. Cl.
*H04W 4/02*    (2009.01)
*H04W 4/06*    (2009.01)

(52) U.S. Cl.
CPC ............... *H04W 4/02* (2013.01); *H04W 4/06* (2013.01)

(58) Field of Classification Search
CPC ............ H04W 4/02; H04W 4/06; H04W 4/22
USPC .................. 455/456.1–457, 404.1, 404.2
See application file for complete search history.

(56) References Cited

U.S. PATENT DOCUMENTS

| 6,973,321 | B2 | 12/2005 | Hjelmvik |
| 7,010,293 | B2 | 3/2006 | Go |
| 7,738,834 | B2 | 6/2010 | Rischmueller |
| 8,213,972 | B2 | 7/2012 | Neria et al. |
| 8,477,693 | B1 | 7/2013 | Knoop et al. |
| 8,484,234 | B2 | 7/2013 | Ramer et al. |
| 8,521,140 | B2 | 8/2013 | White et al. |

(Continued)

FOREIGN PATENT DOCUMENTS

| WO | 2004049226 A1 | 6/2004 |
| WO | 2009148338 A2 | 12/2009 |
| WO | 2012171045 A1 | 12/2012 |

OTHER PUBLICATIONS

Udu-Gama, N. "Mobile 2.0: Mobile Cell Broadcasting for Commercial Use and Public Warning in the Maldives." LIRNEasia, Second India Disaster Management Congress, Jul. 14, 2009, 43 pages.

(Continued)

*Primary Examiner* — Erica Navar
(74) *Attorney, Agent, or Firm* — Amin, Turocy & Watson, LLP

(57) ABSTRACT

Mechanisms for user application access to cell broadcast messaging in a mobile communication environment are described herein. By way of example, a location-based message such as a cell broadcast message can be received by an operating system of a mobile device, which can generate an instance of the message for a user application registered with the operating system. Upon determining the message to be a location-based message, message data can be converted into a fielded data object which can be utilized by user application of the mobile device. Data, commands, etc., of the CB message can then be implemented in conjunction with application processes or business logic to control device functionality, perform tasks, output data over a user interface, initiate communications, and so forth.

20 Claims, 9 Drawing Sheets

(56) References Cited

U.S. PATENT DOCUMENTS

| | | |
|---|---|---|
| 2001/0016483 A1 | 8/2001 | Nakajima |
| 2003/0050837 A1 | 3/2003 | Kim |
| 2004/0038665 A1 | 2/2004 | Hosono |
| 2004/0048604 A1 | 3/2004 | Idei |
| 2006/0004630 A1 | 1/2006 | Criddle et al. |
| 2006/0004632 A1 | 1/2006 | Kelsen et al. |
| 2007/0042760 A1 | 2/2007 | Roth |
| 2007/0178889 A1 | 8/2007 | Cortegiano et al. |
| 2007/0202886 A1* | 8/2007 | Dhebri ............... H04W 4/02 455/456.1 |
| 2007/0214040 A1 | 9/2007 | Patel et al. |
| 2007/0293201 A1 | 12/2007 | Meda |
| 2008/0039112 A1* | 2/2008 | Park ............... H04W 48/12 455/453 |
| 2009/0089146 A1 | 4/2009 | Teterin |
| 2010/0069035 A1* | 3/2010 | Johnson ............... H04W 4/02 455/404.1 |
| 2010/0082972 A1 | 4/2010 | Benco et al. |
| 2010/0146079 A1 | 6/2010 | Bramley et al. |
| 2010/0262449 A1 | 10/2010 | Monteforte et al. |
| 2010/0312645 A1 | 12/2010 | Niejadlik et al. |
| 2011/0032909 A1* | 2/2011 | Park ............... H04W 36/22 370/332 |
| 2012/0028622 A1* | 2/2012 | Eardley ............. H04M 3/42102 455/417 |
| 2012/0295593 A1 | 11/2012 | Duenas et al. |
| 2013/0066717 A1 | 3/2013 | Marovets |
| 2014/0213277 A1* | 7/2014 | Jang ............... H04W 28/08 455/453 |

OTHER PUBLICATIONS

Kolmel, et al. "Location Based Advertising." The First International Conference on Mobile Business, Sep. 2002, 7 pages.

Reyck, et al. "Broadcast scheduling for mobile advertising." (Jul.-Aug. 2003) Operations Research (c)2003 INFORMS: vol. 51, No. 4, pp. 509-517.

Haddadi, et al. "MobiAd: Private and Scalable Mobile Advertising." (2010) MobiArch Proceedings of the Fifth ACM International Workshop on Mobility in the Evolving Internet Architecture, ACM: New York, NY, pp. 33-38.

* cited by examiner

PROCESSING AND DISPLAY OF LOCATION BASED MESSAGES FOR MOBILE DEVICES

TECHNICAL FIELD

The present application relates generally to location based messaging in mobile communications, e.g., enabling processing and display of location based messages for user applications of a mobile device.

BACKGROUND

Mobile carriers and mobile equipment manufacturers have been implementing capabilities to distribute emergency messages en masse to mobile subscribers. Generally, these capabilities are governed by regulatory bodies in different states or nations. For instance, in the United States, the Federal Communications Commission adopted a network structure, operational procedures and technical requirements for the commercial mobile alert system (CMAS) (also referred to as wireless emergency alerts, or personal localized alerting network). CMAS is an alerting network operable in the United States to disseminate emergency alerts to mobile devices, such as cell phones, pagers, or other mobile devices configured to communicate with a mobile communications provider (e.g., tablet computer, personal digital assistant, laptop and wireless PC card, etc.). CMAS enables federal agencies to aggregate and send alerts to participating wireless providers, who can distribute the alerts to customers and compatible devices via cell broadcast. The cell broadcast technology allows a message to be distributed to mobile terminals communicating with a set of cell towers managed by a network operator.

BRIEF DESCRIPTION OF THE DRAWINGS

Numerous aspects, embodiments, objects and advantages of the subject matter presented herein will be apparent upon consideration of the following detailed description, taken in conjunction with the accompanying drawings, in which like reference characters refer to like parts throughout, and in which.

DETAILED DESCRIPTION

Figure 1:
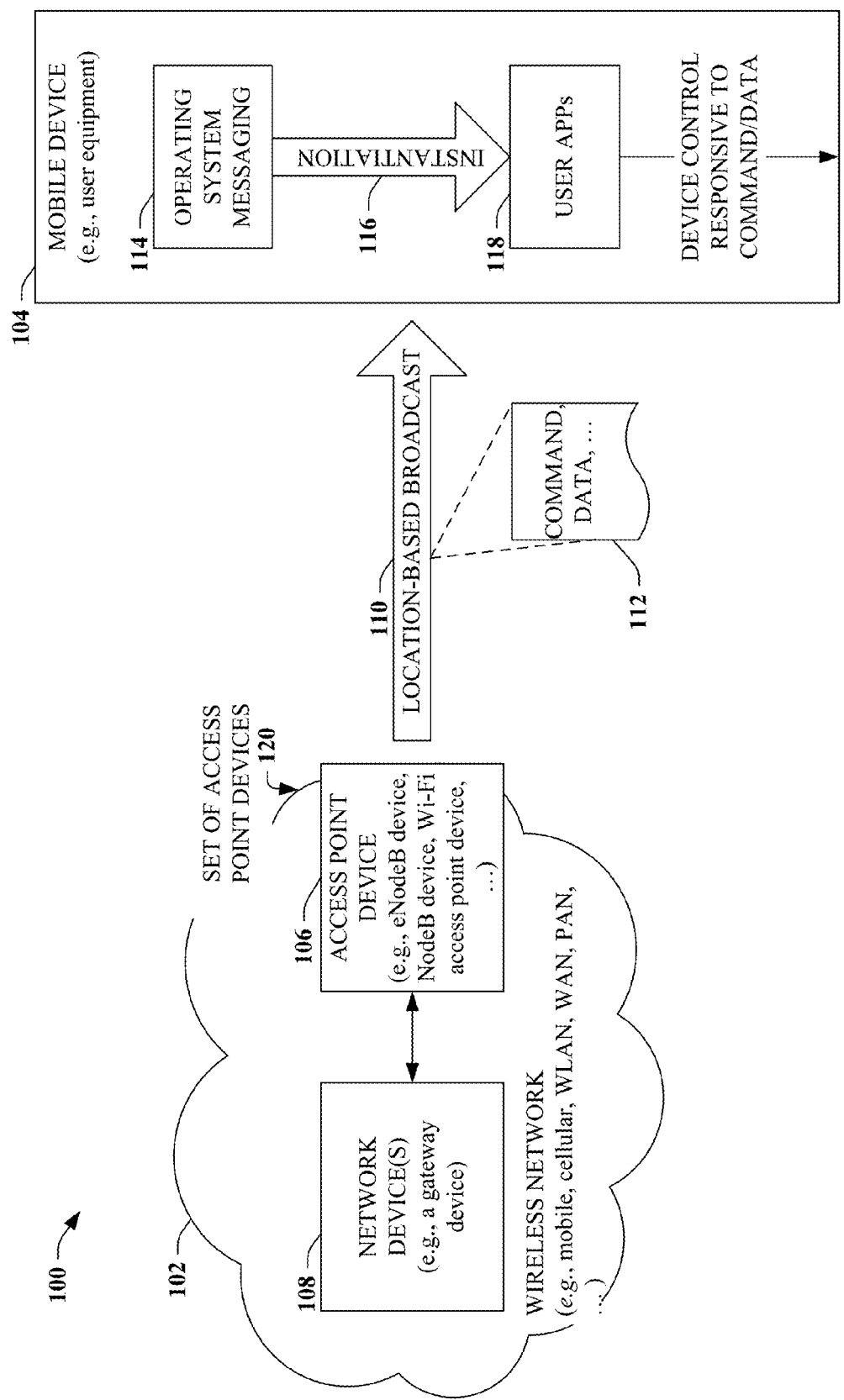
FIG. 1 illustrates a block diagram of an example system for providing commercial cell broadcast (CB) in mobile communications, according to various aspects.

Mobile traffic has been growing at a very fast pace and that growth trend is expected to continue. To meet the mobile traffic growth as well as to improve end user experience, mobile service providers are actively seeking mechanisms to improve system capacity and end user experience in a manner that can leverage all available radio technologies, including, for example, cellular networks (e.g., universal mobile telecommunications system (UMTS), long term evolution (LTE), etc.), and non-cellular networks such as Wi-Fi or any wireless local area network protocol such as IEEE 802.11, or others.

In addition to text communication, voice communication and others, mobile technology and mobile communication has facilitated a new form of engaging in commerce. Subscribers utilizing mobile technology can access the Internet to engage in web-based commerce, as one example. Other examples include commerce that is more mobile-specific, such as targeted advertising, peer-to-peer advertisements, and so forth. Location-based messaging, in which a message(s) is transmitted to a set of mobile devices within a geographic area, is one mechanism that may further mobile commerce, by transmitting advertisements, coupons, or other incentives to subscribers within a predetermined geographic region (e.g., near a store sponsoring the message, within or near a mall, etc.). However, location-based messaging is currently quite limited in mobile communication standards, available for emergency cell broadcasts like commercial mobile alert system (CMAS), earthquake and tornado warning system (ETWS), and the like. While it is possible to transmit commercial messages over the CB messaging systems, access to at least some of the message content (e.g., data objects, . . . ) is available to operating system (OS) messaging applications (e.g., a short message service (SMS)/text message service/multimedia messaging service (MMS) browser embedded within a mobile operating system) and not available to user applications installed by a mobile device user or otherwise not implemented as part of a mobile device's OS.

As mentioned, CMAS uses cell broadcast technology to allow a message to be distributed to mobile terminals communicating with a set of cell towers managed by a network operator. In this regard, cell broadcast technology differs from point-to-point technology, in that it is configured as an unconfirmed push service. Thus, an operator can direct the message to all mobile devices in a cell or group of cells (or an entire network of cells), but does not know who receives the message. As such, cell broadcast is not affected by traffic load, and cell broadcast messages can be delivered even when load spikes saturate connection capabilities of radio towers. Thus, when a large numbers of subscribers attempt to communicate at once (e.g., during a disaster), a network provider's capacity to interconnect subscribers may be overwhelmed, leaving many subscribers unable to obtain service. But the cell broadcast technology can still provide a mechanism to transmit information to those subscribers to provide assistance in an emergency.

The subject disclosure provides various embodiments that provide user applications access to CB messaging. In some embodiments, the subject disclosure can provide the benefit of commercial CB messaging, without such messaging being explicitly written into mobile communication standards and implemented by service providers and user equipment manufacturers. Utilizing CB messaging systems, data, commands, or the like can be broadcast to mobile devices, and received by the OS messaging application per mobile standards. An instance of the received CB message can be requested from the OS (e.g., by registering with the OS to receive an indication of CB message receipt and a subset of data included in the CB message), which outputs a subset of the CB message to a user application domain in conjunction with the request. The subset of the CB message can be tested to verify the CB message is a location-based message. Upon verification, the CB message is converted into a fielded data object which can be utilized by user application of the mobile device. Data, commands, etc., of the CB message can then be utilized by user applications to control device functionality (e.g., via an embedded application programming interface [API] protocol(s)), perform tasks, output data to a user of the mobile device, and so forth. In this manner, a wide array of mobile device-related functions and features available through user applications installed on a mobile device can be engaged through the CB messaging system, facilitating commercial and inter-personal applications of the CB messaging systems.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with reference initially to FIG. 1, a system 100 for mobile device communications is depicted. System 100 can facilitate access and processing of mobile messages broadcast to a geographic region by a wireless network(s) by user applications of mobile devices within the geographic region and communicating with the wireless network(s). As utilized herein, the term location-based message refers to a message (e.g., a transmission, a text, a short message, a media message, a multimedia message, and so forth) broadcast within a geographic region covered by a network, to devices connected to the network. The geographic region can be small, such as a region served by a single local area network or personal area network access point (e.g., a Wi-Fi access point, a Femtocell, a Bluetooth transmitter, . . . ), or a subset of such a region, or medium, such as a single sector or cell of a terrestrial radio network, or very large, such as a subset of a regional or national network of radio towers operated by a national wireless carrier, or the like, or various suitable degrees there between. Furthermore, the network can include a mobile communication network (e.g., global system for mobile communication [GSM] network, code division multiple access [CDMA] network, universal mobile telecommunication system [UMTS] network, enhanced data rate for GSM evolution [EDGE] network, third generation partnership project [3GPP] long term evolution [LTE] network, high speed packet access [HSPA] network, or the like, or a suitable combination thereof), a wireless interoperability for microwave access (WiMAX) network, a local area network such as a Wi-Fi network, an optical network, a Bluetooth network, a personal area network, an optical wireless communication network, or other suitable terrestrial wireless communication network, or suitable combinations thereof. Thus, the geographic region and the network can be quite flexible in various embodiments of the subject disclosure.

As a result of the access to and processing of location-based messages, user applications can be configured to employ data, information, commands, etc., included in location-based messages to perform functions related to the mobile device. Examples of such functions include nearly any function that a user application can perform related to a mobile device, such as controlling hardware or software of the mobile device, initiating a communication on the mobile device, accessing data stored on the mobile device, outputting information via user interface features of the mobile device, activating user prompts, acquiring user permissions, transmitting a message, initiating a call, engaging process logic in conjunction with hardware, software or data of the mobile device, or the like, or suitable combinations thereof. A few use-case examples will be discussed later on to provide context for various aspects of the subject disclosure, but it should be appreciated that the subject disclosure should not be limited to the use-case examples; the disclosed embodiments and other embodiments—including suitable and related use-cases—known to one of ordinary skill in the art or made known to one of ordinary skill by way of the context provided herein are considered within the scope of the subject disclosure.

As depicted by FIG. 1, system 100 can include a wireless network 102. Wireless network can include a mobile network, a cellular network, a wireless local area network, a wide area network, a personal area network, and so forth. Wireless network 102 can have one or more mobile devices 104 with which wireless network 102 is configured to transmit, receive or exchange data wirelessly. Such data can include communication protocols, such as signaling information, timing signals, control signals, commands, etc., as well as various traffic information, such as messages, voice traffic, audio traffic, data traffic and various iterations thereof (e.g., text communication, media traffic, multimedia traffic, audio traffic, video traffic, audio-visual traffic, streaming media traffic, web browsing traffic, and other suitable user traffic). Mobile device(s) 104 can be configured to include an operating system 114, as well as an operating system messaging platform 115. Operating system messaging platform 115 can include any suitable messaging application compliant with a mobile communication standard for receiving and displaying cell broadcast (CB) messages on mobile device(s) 104. In some aspects, operating system messaging platform 115 can comprise a suitable short message service (SMS) messaging application. In other aspects, operating system messaging platform 115 can comprise a suitable text message messaging application. In still other aspects, operating system messaging platform 115 can comprise a suitable multimedia messaging service (MMS) messaging application. Still other embodiments are permitted within the scope of the subject disclosure, however, that facilitate receipt and display of cell broadcast messages or other suitable location-based messages.

Communication between wireless network 102 and mobile device(s) 104 can be facilitated through one or more access point devices 106. Access point device(s) 106 can comprise an eNodeB device, a NodeB device, a Wi-Fi access point device, a WiMAX access point device, a minicell, microcell or Femtocell device, or other suitable cellular access point, and so forth. In addition, one or more network devices 108 (e.g., a gateway device) can be configured to provide access to other networks for the communication, including the Internet, one or more commercial intranets, a public emergency service network (e.g., CMAS message network, ETWS message network, or the like), and so on.

In various embodiments of the subject disclosure, network device(s) 108 can be configured to transmit a location-based broadcast 110 over a subset of a set of access point devices 120 associated with wireless network 102, the subset including access point device(s) 106 for the example communication of system 100. Thus, network device(s) 108 can target one of a set of geographic regions having a position and area determined at least in part by coverage of selected ones of set of access point devices 120, and not including area covered by unselected ones of set of access point devices 120 (as well as area not covered by any of set of access point devices 120). Additionally, subsets of cells, such as a sector(s) or the like, covered by the selected ones of set of access point devices 120 can be targeted for the geographic area, utilizing beamshaping techniques or the like. Note that geographic area need not be a single contiguous area, but can include a contiguous area, or multiple areas at least a subset of which are not contiguous with one or more other ones of the multiple areas.

Included within location-based broadcast 110 can be an information message 112. Information message can include one or more commands, data, metadata, identifying information, communication information, signaling information, control information, or the like, which can be processed by one of a set of user applications 118 installed on mobile device(s) 104. Location-based message 110 is received by operating system 114 and made available to operating system messaging application 115 of mobile device(s) 114. In response at least to receiving location-based broadcast 110, operating system 114 can be configured to create an instantiation 116 of information message 112 and at least a subset of the information, commands, data, . . . , included within information message 112 can be included as part of the instantiation 116. Instantiation 116 can be responsive to, in addition to receiving location-based broadcast 110, registration by one of user applications 118 for notification of such receipt of location-based broadcast 110 by operating system 114. This registration can be referred to as an "intent" (e.g., registration for an intent related to receipt of cell broadcast messages) throughout this disclosure, where intent has the general meaning of registering to receive a notification—in this case a notification of receipt of location-based message 110 and where the notification optionally includes at least a subset of information included within information message 112 provided by location-based message 110.

In some disclosed embodiments, instantiation 116 can be tested by one or more of user applications 118 for compatibility with a location-based message(s). If compatibility is determined, the one or more of user applications 118 can parse the subset of information from information message 112 and format the subset of information into a fielded data object, in alternative or additional embodiments of the subject disclosure. In still other embodiments, user applications 118 can access the fielded data object, and perform functions, execute business logic, control hardware and software of mobile device(s) 104, initiate communications, and so forth, in response to the fielded data object. This can enable user applications 118 to perform functions in response to information transmitted by network 102 over a broadcast-type messaging platform, facilitating a commercial CB implementation without need for explicit commercial CB definitions in wireless communication standards. Accordingly, the subject disclosure can facilitate various user-related, commerce-related or broadcast communication-related activities utilizing various location-based messaging capabilities, including those currently implemented in wireless standards (e.g., CMAS, ETWS, . . . ) as well as facilitating future utilization of broadcast messaging capabilities in the process of implementation or not yet implemented. Various embodiments of the foregoing are discussed in more detail throughout this Specification.

Figure 2:
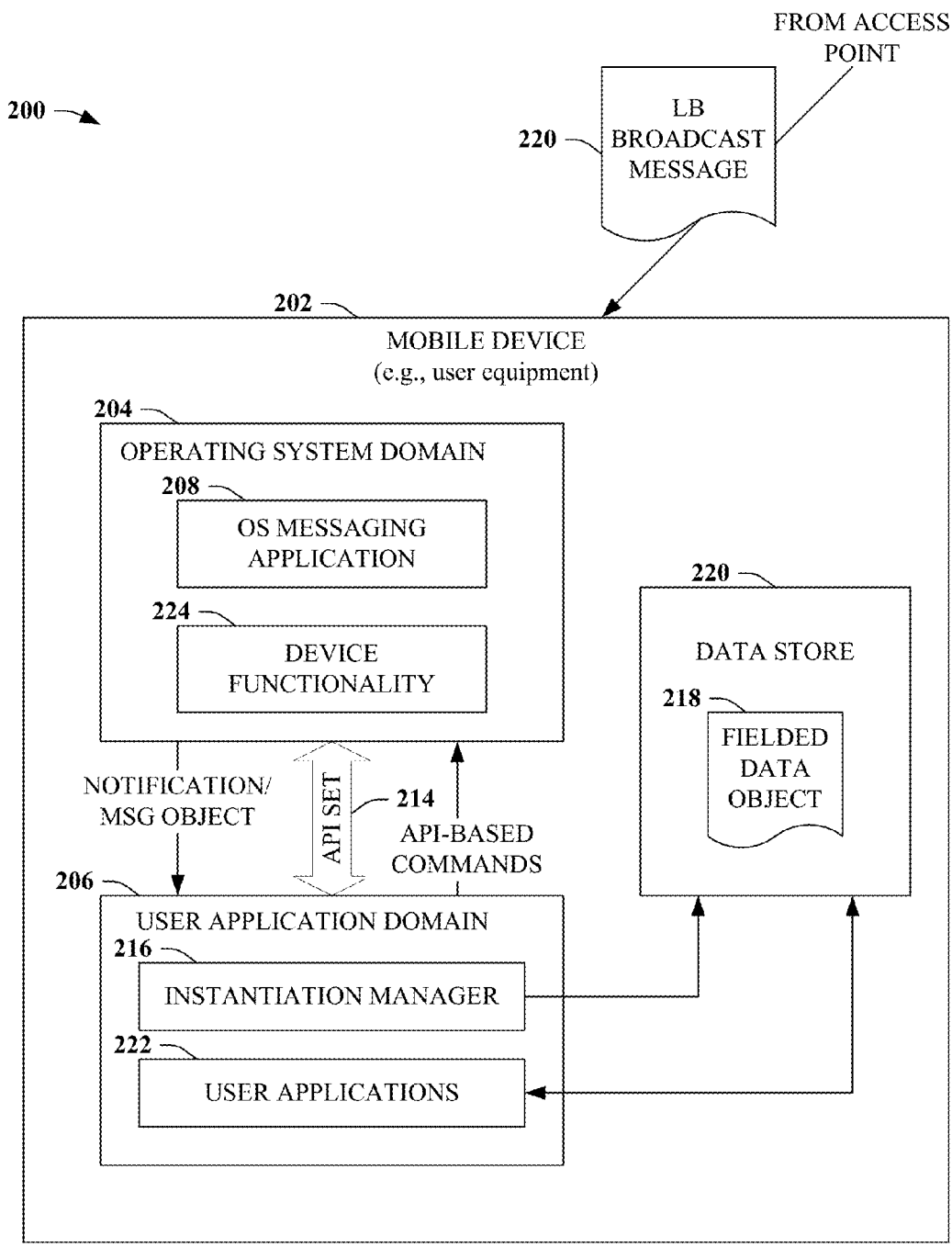
FIG. 2 depicts a block diagram of an example mobile device configured to receive and process location-based messages in a user application domain.

FIG. 2 illustrates a block diagram of a sample wireless communication 200 according to various embodiments of the subject disclosure. Wireless communication 200 can comprise a mobile device (e.g., a user equipment, . . . ) 202 configured to communication with a wireless network (not depicted). For instance, mobile device 202 can receive a location-based broadcast message 220 from the wireless network. Location-based broadcast message 220 can comprise a CB message, in some aspects, whereas in other aspects location-based broadcast message 220 can comprise a non-standard location-based message, or the like.

Mobile device 202 can include an operating system domain 204 and a user application domain 206. Operating system domain 204 can include an operating system of mobile device 202 that comports with one or more suitable communication standards affecting mobile communication technologies to which mobile device 202 is configured to operate. It should be appreciated that the operating system of mobile device 202 can be configured differently in different embodiments; the operating system can be configured to communicate with one wireless network, or multiple wireless network, but generally will include an operating system 208 and an operating system messaging application 210 configured at least to receive location-based broadcast message 220. In an alternative or additional embodiment, operating system 208 can be configured to notify an instantiation manager 216 (e.g., a user application, . . . ) within a user application domain 206 of mobile device 202, in response to receipt of the location-based broadcast message 220. Further, at least a subset of data included within location-based broadcast message 220 is provided with the notification to the one or more user applications. In some aspects, however, the subset of data can be unformatted text, or data formatted differently from a format provided by location-based broadcast message 220. Formatting of the subset of data can be controlled by operating system 208 of mobile device 202, in some aspects, or operating system messaging application 210, in other aspects.

Instantiation manager 216 can be configured to analyze information included with the notification, with respect to one or more stored formats for location-based messaging. If a suitable match is found to one of the stored formats, instantiation manager 216 can initiate creation of a fielded data object 218 from the information, and store fielded data object 218 in a data store 220 of mobile device 202. If no suitable match to the one or more stored formats for location-based messaging is identified by instantiation manager 216, the information can be discarded by instantiation manager 216, and no fielded data object 218 saved.

Once fielded data object 218 is created and stored in data store 216, one or more user applications 222 within user application domain 206 of mobile device 202 can utilize fielded data object 218. For example, a user application 222 can control or command device functionality 224 based at least in part on information provided by location-based broadcast message 220 and stored in fielded data object 218. This can include, for instance, switching from one wireless network to another suitable wireless network, displaying a message or content on a user display of mobile device 202 (e.g., an advertisement, a coupon, a communication, a promotional offer, etc.), report location of mobile device 202 as being within a region affected by an emergency, natural disaster, etc., and so forth. Control or command of device functionality 224 can be facilitated via an API set 214 of mobile device 202, as is known in the art or made known to one of ordinary skill in the art by way of the context provided herein. As such, wireless communication 200 can facilitate a very diverse and flexible set of functionality responsive to broadcast messaging transmitted to and received by mobile device 202.

Figure 3:
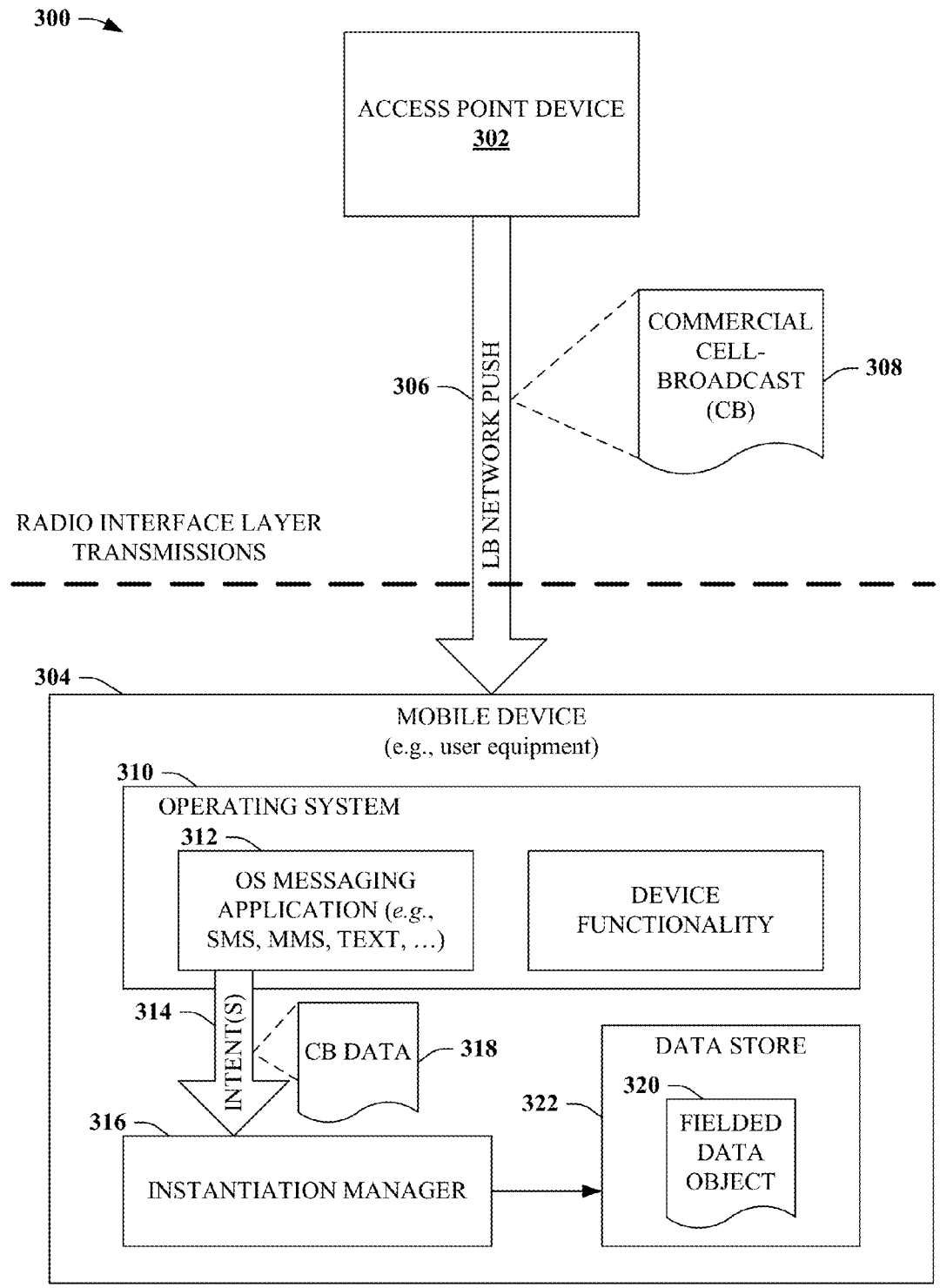
FIG. 3 illustrates a block diagram of a sample system for providing commercial CB messages to user applications of a mobile device in one or more embodiments.

FIG. 3 illustrates a block diagram of a sample wireless system 300 according to one or more embodiments of the subject disclosure. As depicted, wireless system 300 can comprise a mobile device 304 registered for wireless communication with an access point device 302 of a wireless network. Access point device 302 can be employed to implement a location-based network push service 306 to convey a commercial CB message 308 to at least a subset of a geographic region. In various embodiments, mobile device 304 can be located within the subset of the geographic region, and can thereby receive location-based network push service 306 and commercial CB message 308. In additional embodiments, location-based network push service 306 can be conducted over a radio interface layer of a wireless communication between access point device 302 and mobile device 304.

An operating system messaging application 312 of an operating system 310 of mobile device 304 can receive commercial CB message 308 in the radio interface layer. Operating system messaging application 312 can perform functions related to location-based network push service 306 (e.g., display commercial CB message 308 as an incoming message, display content of commercial CB message 308 on a graphic display of mobile device 304, etc.). Additionally, operating system 310 can identify whether one or more intents are registered in relation to receipt of location-based network push service 306. If the intent(s) is registered, operating system 310 can output at least a subset of CB data 318 included in the commercial CB message 308 as part of an intent notification 314 to an instantiation manager 316 of mobile device 304. Instantiation manager 316 can format the subset of CB data 318 as a fielded data object 320, stored in a data store 322 of mobile device 304 and made available to user applications of mobile device 304.

Mobile device 304 can be configured to provide efficient access to and utilization of CB messages for diverse and flexible functions available to user applications, including user interactivity, business logic and other processing capabilities of user applications. In addition, wireless system 300 can avoid user applications needing to poll background information generated by operating system 310 or operating system messaging application 312 to identify received messages at operating system messaging application 312, or platform specific (rather than network) push notification technology for out-of-band notifications (e.g., such as an out-of-band implementation of location-based network push service 306). This polling can be avoided, for instance, by utilizing the network push functionality of location-based network push service 306, described herein. Furthermore, using a location-based network push service 306 can facilitate sending commercial CB message 308 to devices within a geographic area. User applications installed on mobile device 304 can be listed as a registered receiver for CB messages via registering an intent with operating system 310. Thus, once a CB-type message is received in the radio interface layer, the operating system can notify registered user applications (e.g., instantiation manager 316) of the message, which can detect for an appropriate serialization encoding (which can vary by operating system) for the CB message and parse data included with the CB message into fielded data object 320. User applications can then display content in response to the data, affect business logic of user applications, or apply policies thereof.

In the example embodiment of commercial CB message 308, CB systems facilitate efficient distribution of messages to suitable mobile devices 304 within a predetermined geographic region. From a perspective of mobile device 304, CB messaging is battery and network efficient, as location-based network push service 306 avoids persistent polling of instantiation manager 316, for instance. Furthermore, CB messaging can be implemented without interrupting signaling between mobile device 304 and access point device 302. As part of a policy enforcement solution, user applications can access a CB message and interpret rules, resource requirements, and the like, to perform functions. One example is to analyze network congestion data (e.g., network resource utilization, throughput availability, latency, and so on) and shift mobile network to a less congested network in response to satisfaction of a condition related to congestion on a serving network. This can result, for instance, in switching from a third generation to a fourth generation network, from cellular to Wi-Fi, or the like (e.g., see FIG. 4, infra).

Figure 4:
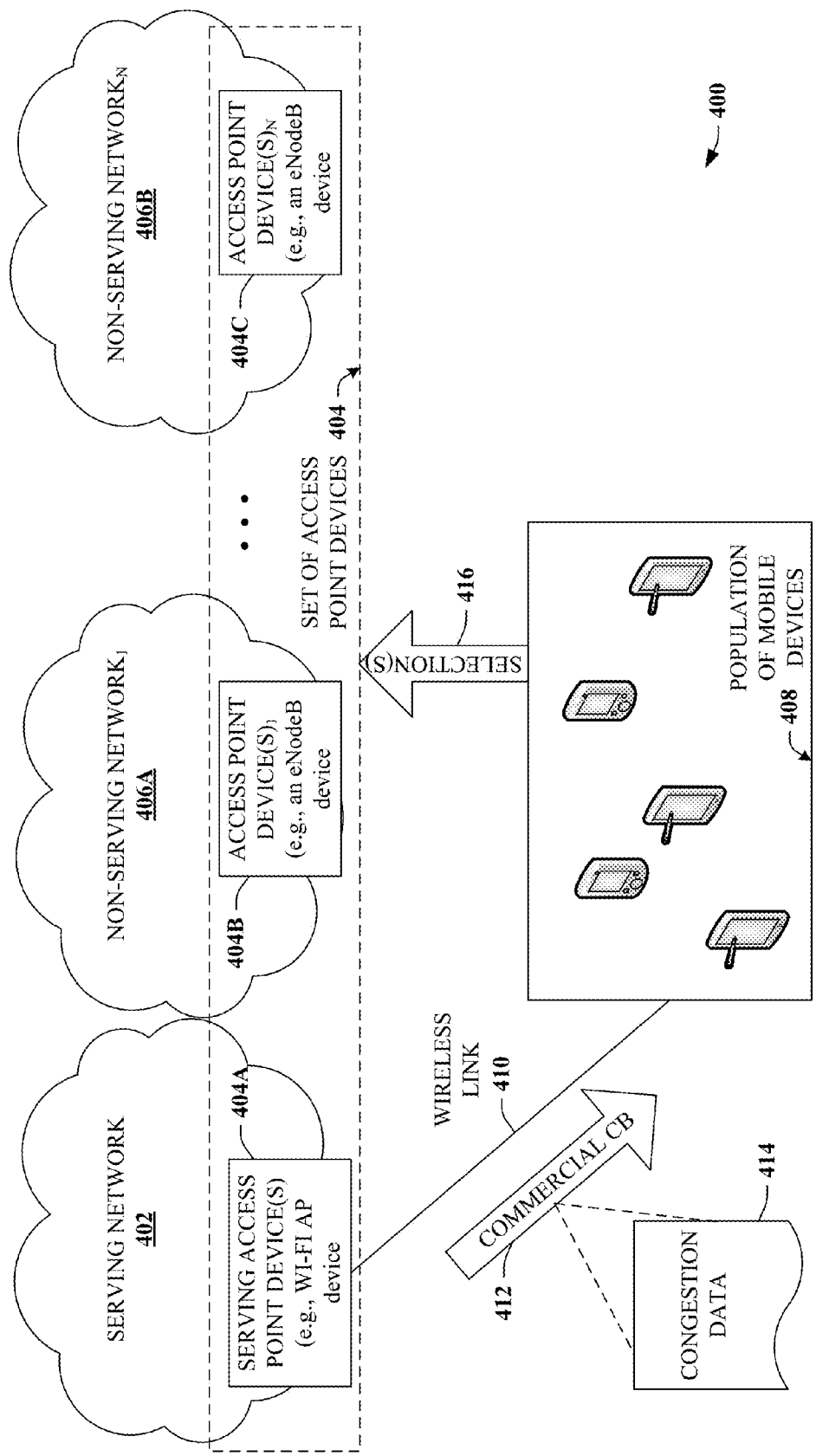
FIG. 4 depicts a block diagram of an example mobile communication environment for push-based control of mobile functionality, in other embodiments.

FIG. 4 depicts a block diagram of an example wireless communication environment 400 related to utilization of commercial CB messaging for mobile communications, in alternative or additional embodiments of the subject disclosure. Wireless communication environment includes a serving network 402 operating for a population of mobile devices 408, and one or more non-serving networks, including non-serving network$_1$ 406A . . . non-serving network$_N$ 406B (referred to collectively as non-serving networks 406A-406B). In some embodiments, non-serving networks 406A-406B can act as a serving network for other mobile devices not depicted by wireless communication environment 400, in which analogous functionality can be provided by non-serving networks 406A-406B for such other mobile devices as is described for serving network 402 and population of mobile devices 408.

Respective networks include respective ones of a set of access point devices 404. For instance, serving network 402 includes a service access point device(s) 404A, non-serving network$_1$ 406A includes an access point device(s)$_1$ 404B, and non-serving network$_N$ 406B includes an access point device(s)$_N$ 404C. At least a subset of set of access point devices 404 are observable by at least a subset of population of mobile devices 408. Accordingly, the subset of population of mobile devices 408 can conduct a handover to one or more of access point device(s)$_1$ 404B or access point device(s)$_N$ 404C (referred to collectively as non-serving access point devices 404B-404C), per various handover criteria stored and executed at respective ones of population of mobile devices 408.

In addition to the foregoing, serving network 402 can transmit a commercial CB message 412 over a wireless link 410 (e.g., in a radio interface layer) to a geographic region in which population of mobile devices 408 are located. Commercial CB message 412 can include a congestion message 414, including congestion data for serving network 402 as well as one or more of non-serving networks 406A-406B. Population of mobile devices 408 can instantiate commercial CB message 412 and generate at least a subset of the congestion data in congestion message 414 as a fielded data object. As a result, user applications operating on respective ones of population of mobile devices 408 can be configured to access the congestion data and make policy decisions related to conducting a handover from serving network 402 to one or more of non-serving networks 406A-406B. Moreover, the policy decisions can be standardized, or personalized per respective ones of population of mobile devices 408, facilitating either uniform or diverse handover decisions in response to commercial CB message 412. For instance, if the user application is hardcoded or unalterable, policy decisions of population of mobile devices can be fixed according to a function related to the congestion data and wireless characteristics observed at respective ones of mobile devices 408. As another example, where the user application can be modified, one or more functions or variations thereof can set the policy decisions for conducting the handover. But for various embodiments, wireless communication environment 400 facilitates population of mobile devices 408 making handover selections 416 in response to push notification messaging conducted on a CB messaging platform, that can be implemented without interrupting traffic signaling of population of mobile devices, and while minimizing power consumption associated with CB-related handover selections 416.

The aforementioned diagrams have been described with respect to interaction between several systems, apparatuses, components, networks, network interfaces, or the like. It should be appreciated that such diagrams can include those networks or systems specified therein, some of the specified networks or components thereof, or additional networks or components. For example, system 100 could include mobile device 104 and mobile device 202, separate from or included within population of client devices 408, in conjunction with wireless network 102, and access point device 302, as one possible example. Sub-components could also be implemented as components communicably connected to other sub-components rather than included within a parent component. Additionally, it should be noted that two or more components could be combined into a single component providing aggregate functionality. For instance, user applications 222 can include instantiation manager 216 to facilitate identifying a serialization encoding of a message and generating a fielded data object, by way of user applications 222. Components of the disclosed networks, systems and apparatuses can also interact with one or more other components not specifically described herein but known by those of skill in the art, or made known to one of skill in the art by way of the context provided herein.

Figure 5:
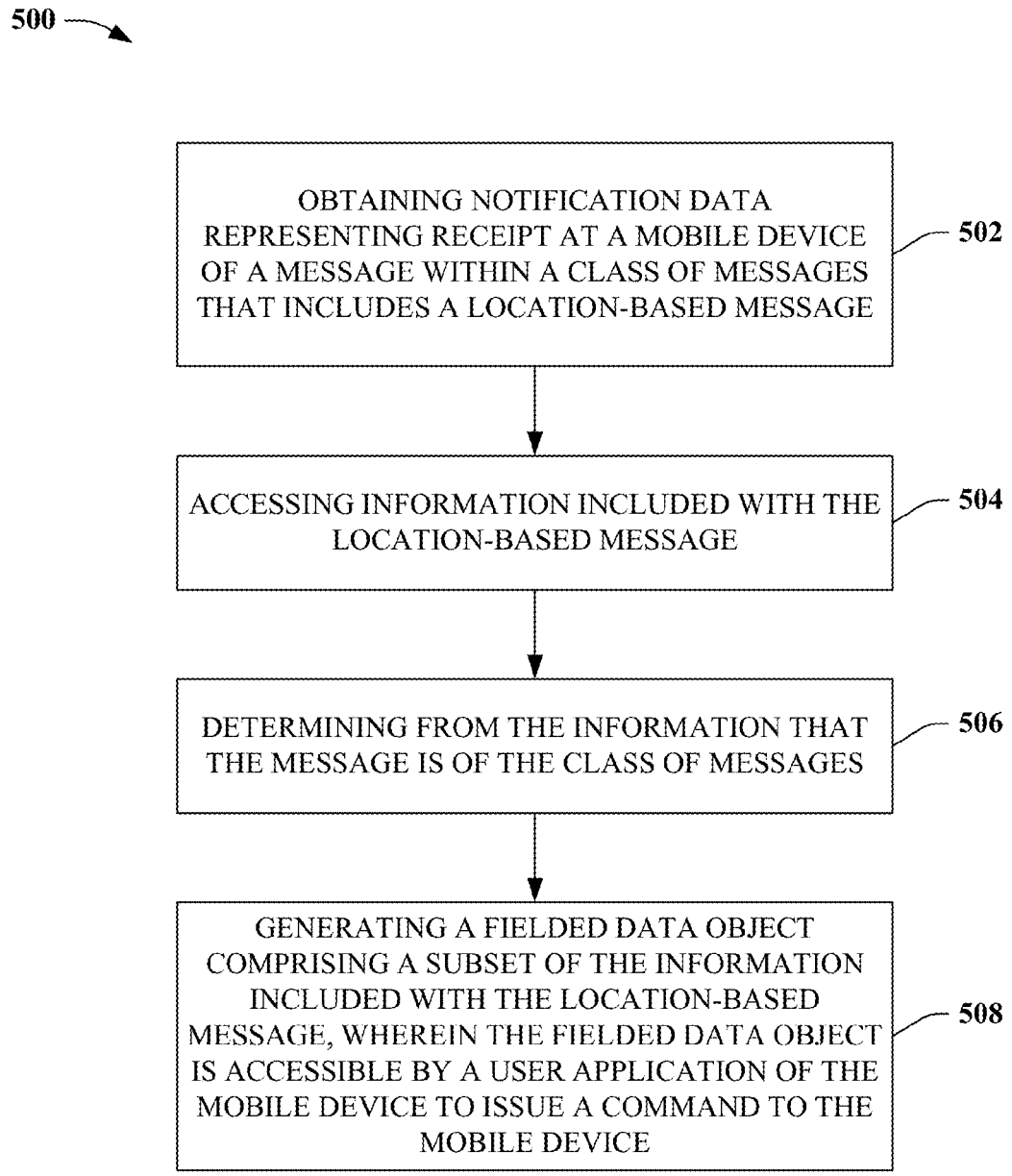
FIG. 5 illustrates a flowchart of an example method for providing commercial CB messaging available to user applications of a mobile device, according to various aspects.
Figure 6:
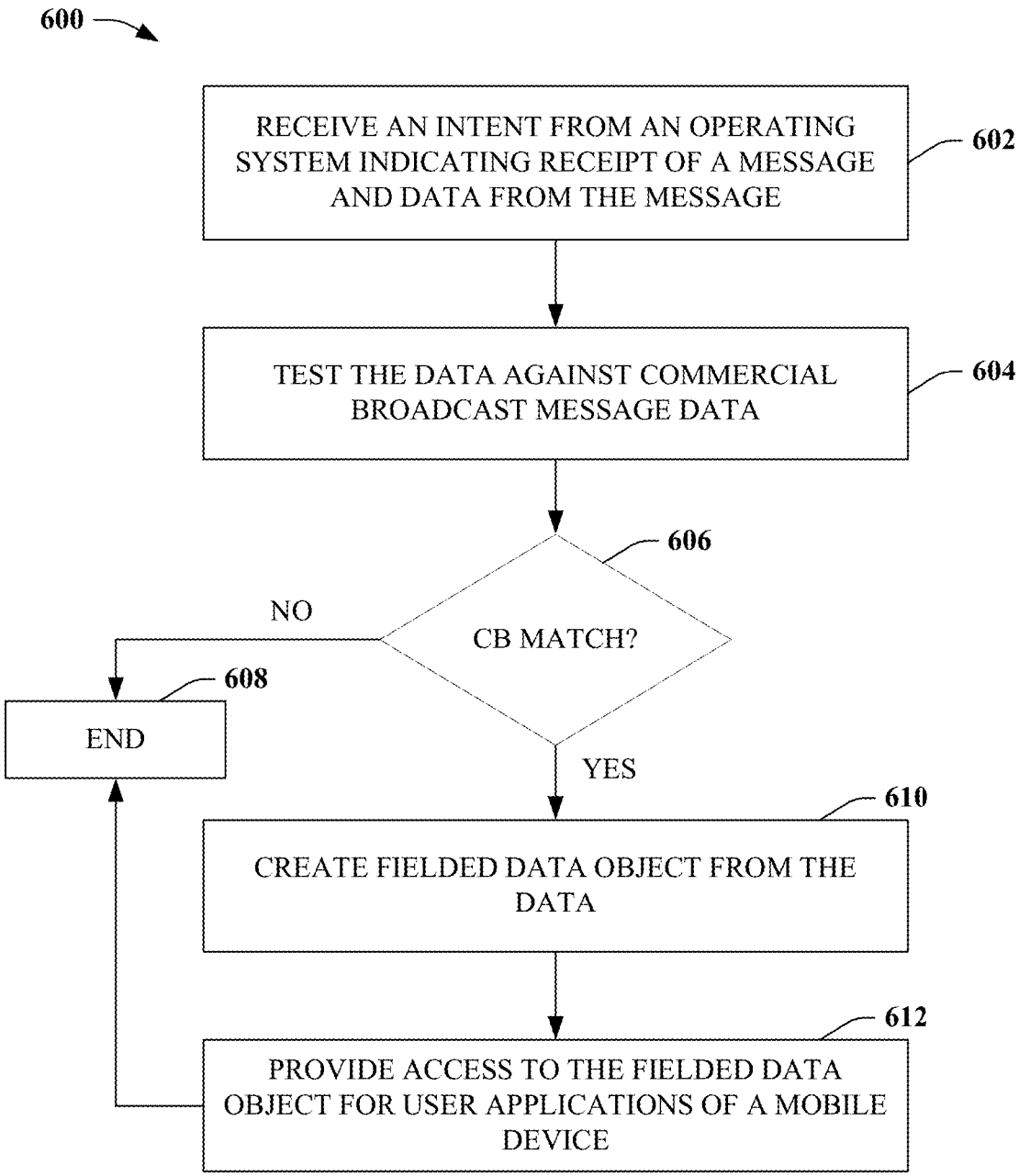
FIG. 6 illustrates a flowchart of a sample method for receiving and processing location-based messages by a user application operating on a mobile device.

FIGS. 5 and 6 illustrate various methods in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 5 illustrates a flowchart of an example method 500 for providing commercial location-based broadcasting messaging in mobile communications, according to one or more disclosed embodiments. At 502, method 500 can comprise obtaining, by a system comprising a processor, notification data representing receipt at a mobile device of a message. The message can be, for instance, a message within a class of messages that includes a location-based message. An example of a suitable location-base message can include a CB message, or the like.

At 504, method 500 can comprise accessing, by the system, information included with the message. The information can be formatted or unformatted. For instance, the information can include traffic, content, etc., in conjunction with metadata, hypertext data, or other formatting data, or without such formatting data. At 506, method 500 can comprise determining, by the system and based on the information, that the message is a location-based message of the class of messages. The determining can be performed by comparing the traffic, content, etc, or the formatting data (if any) with stored information pertaining to one or more respective location-based messaging criteria. One example of a suitable criterion can be a serialization encoding, which can be extracted from the message content or formatting data and compared with stored serialization encoding information related to one or more types of location-based messages.

At 508, method 500 can comprise generating, by the system, a fielded data object comprising a subset of the information included with the location-based message, wherein the fielded data object is accessible by a user application of the mobile device to issue a command to the mobile device. The command can relate to hardware or software of the mobile device, in some aspects. In alternative or additional aspects, the command can employ an API set of the mobile device to control a hardware or software feature of the mobile device (e.g., control a camera of the mobile device, a wireless transceiver(s) of the mobile device, location monitoring systems of the mobile device, communication systems of the mobile device, and so on).

In a further embodiment, method 500 can comprise assigning, by the system, at least a subset of the fielded data object as a public class. For instance, the public class can be a class of data objects that are accessible to user-installed applications of the mobile device. This can be implemented, for example, where the user-installed applications are flagged as a public class application. In some aspects of the embodiment, the user application can utilize a public class of API to issue the command to the mobile device. In alternative or additional aspects, method 500 can comprise limiting, by the system, access to the fielded data object for the user application subject to permissions verification. Where the user application provides proper permissions credentials and the credentials are verified, the user application can be given access to the fielded data object. If the user application does not provide permissions credentials or the permissions credentials cannot be verified, the user application can be denied access to the fielded data object.

FIG. 6 depicts a flowchart of a method 600 of providing display and processing of commercial CB messaging according to additional aspects of the subject disclosure. At 602, method 600 can comprise receiving an intent from an operating system, indicating receipt of a flagged message. In some aspects, the intent can include data from the flagged message; in other aspects, method 600 can issue a query in response to the intent requesting the data from the flagged message.

At 604, method 600 can comprise testing the data against commercial broadcast message data. The testing can comprise, for instance, comparing a serialization encoding of the data to a stored serialization encoding pertaining to the commercial broadcast message. In alternative aspects, the testing can comprise comparing the serialization encoding to a set of data associated with respective serialization encodings for respective ones of a set of broadcast messaging systems. In such aspects, the testing can attempt to identify one of the set of broadcast messaging systems being related to the flagged message, if any.

At 606, a determination is made as to whether a match to a commercial broadcast message is found in response to the testing. If a match is found, method 600 can proceed to 610. Otherwise, method 600 proceeds to 608 and ends.

At 610, method 600 can comprise creating a fielded data object from the data included with the flagged message. At 612, method 600 can provide access to the fielded data object for user applications of a mobile device. In some aspects, the access can be a conditional access. In other aspects, the access can be unconditional. In at least one aspect conditionality or un-conditionality of the access can depend on a type of the flagged message (e.g., which one of the set of broadcast messaging systems is related to the flagged message). Conditional access can require provisioning of credentials and successful validation of the credentials, as one example. Suitable types of conditional data access and application-related credentialing known in the art or made known to one of ordinary skill in the art by way of the context provided herein are considered within the scope of the subject disclosure.

Example Operating Environments

Figure 7:
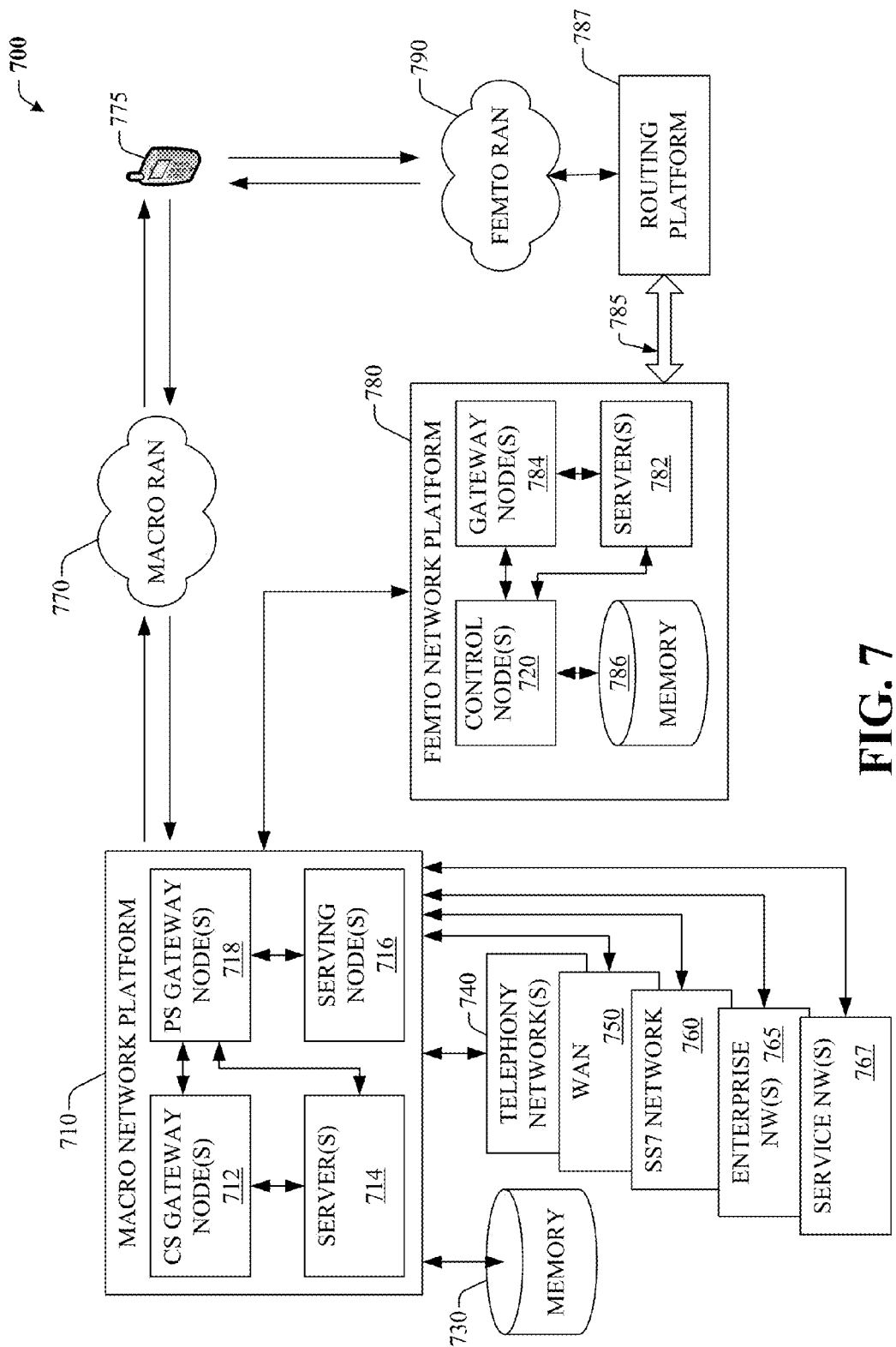
FIG. 7 illustrates a first example of a wireless communications environment with components that can be operable to execute some embodiments of this disclosure.

To provide further context for various aspects of the subject specification, FIG. 7 illustrates an example wireless communication environment 700, with associated components that can enable operation of a Femtocell enterprise network in accordance with aspects described herein. Wireless communication environment 700 includes two wireless network platforms: (i) A macro network platform 710 that serves, or facilitates communication) with user equipment 775 via a macro radio access network (RAN) 770. It should be appreciated that in cellular wireless technologies (e.g., 4G, 3GPP UMTS, HSPA, 3GPP LTE, 3GPP UMB), macro network platform 710 is embodied in a Core Network. (ii) A Femto network platform 780, which can provide communication with UE 775 through a Femto RAN 790, linked to the Femto network platform 780 through a routing platform 787 via backhaul pipe(s) 785. It should be appreciated that Femto network platform 780 typically offloads UE 775 from macro network, once UE 775 attaches (e.g., through macro-to-Femto handover, or via a scan of channel resources in idle mode) to Femto RAN.

It is noted that RAN includes base station(s), or access point(s), and its associated electronic circuitry and deployment site(s), in addition to a wireless radio link operated in accordance with the base station(s). Accordingly, macro RAN 770 can comprise various coverage cells, while Femto RAN 790 can comprise multiple Femto access points or multiple metro cell access points. As mentioned above, it is to be appreciated that deployment density in Femto RAN 790 can be substantially higher than in macro RAN 770.

Generally, both macro and Femto network platforms 710 and 780 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 710 includes CS gateway node(s) 712 which can interface CS traffic received from legacy networks like telephony network(s) 740 (e.g., public switched telephone network (PSTN), or public land mobile network (PLMN)) or a SS7 network 760. Circuit switched gateway 712 can authorize and authenticate traffic (e.g., voice) arising from such networks. Additionally, CS gateway 712 can access mobility, or roaming, data generated through SS7 network 760; for instance, mobility data stored in a VLR, which can reside in memory 730. Moreover, CS gateway node(s) 712 interfaces CS-based traffic and signaling and gateway node(s) 718. As an example, in a 3GPP UMTS network, gateway node(s) 718 can be embodied in gateway GPRS support node(s) (GGSN).

In addition to receiving and processing CS-switched traffic and signaling, gateway node(s) 718 can authorize and authenticate PS-based data sessions with served (e.g., through macro RAN) wireless devices. Data sessions can include traffic exchange with networks external to the macro network platform 710, like wide area network(s) (WANs) 750; it should be appreciated that local area network(s) (LANs) can also be interfaced with macro network platform 710 through gateway node(s) 718. Gateway node(s) 718 generates packet data contexts when a data session is established. To that end, in an aspect, gateway node(s) 718 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 714. It is to be noted that in 3GPP UMTS network(s), gateway node(s) 718 (e.g., GGSN) and tunnel interface (e.g., TTG) comprise a packet data gateway (PDG).

Macro network platform 710 also includes serving node(s) 716 that convey the various packetized flows of information or data streams, received through gateway node(s) 718. As an example, in a 3GPP UMTS network, serving node(s) can be embodied in serving GPRS support node(s) (SGSN).

As indicated above, server(s) 714 in macro network platform 710 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 710. Data streams can be conveyed to gateway node(s) 718 for authorization/authentication and initiation of a data session, and to serving node(s) 716 for communication thereafter. Server(s) 714 can also effect security (e.g., implement one or more firewalls) of macro network platform 710 to ensure network's operation and data integrity in addition to authorization and authentication procedures that CS gateway node(s) 712 and gateway node(s) 718 can enact. Moreover, server(s) 714 can provision services from external network(s), e.g., WAN 750, or Global Positioning System (GPS) network(s) (not shown). It is to be noted that server(s) 714 can include one or more processor configured to confer at least in part the functionality of macro network platform 710. To that end, the one or more processor can execute code instructions stored in memory 730, for example.

In example wireless environment 700, memory 730 stores information related to operation of macro network platform 710. Information can include business data associated with subscribers; market plans and strategies, e.g., promotional campaigns, business partnerships; operational data for mobile devices served through macro network platform; service and privacy policies; end-user service logs for law enforcement; and so forth. Memory 730 can also store information from at least one of telephony network(s) 740, WAN(s) 750, or SS7 network 760, enterprise NW(s) 765, or service NW(s) 767.

Femto gateway node(s) 784 have substantially the same functionality as PS gateway node(s) 718. Additionally, Femto gateway node(s) 784 can also include substantially all functionality of serving node(s) 716. In an aspect, Femto gateway node(s) 784 facilitates handover resolution, e.g., assessment and execution. Further, control node(s) 720 can receive handover requests and relay them to a handover component (not shown) via gateway node(s) 784. According to an aspect, control node(s) 720 can support RNC capabilities.

Server(s) 782 have substantially the same functionality as described in connection with server(s) 714. In an aspect, server(s) 782 can execute multiple application(s) that provide service (e.g., voice and data) to wireless devices served through Femto RAN 790. Server(s) 782 can also provide security features to Femto network platform. In addition, server(s) 782 can manage (e.g., schedule, queue, format . . . ) substantially all packetized flows (e.g., IP-based) it generates in addition to data received from macro network platform 710. It is to be noted that server(s) 782 can include one or more processor configured to confer at least in part the functionality of macro network platform 710. To that end, the one or more processor can execute code instructions stored in memory 786, for example.

Memory 786 can include information relevant to operation of the various components of Femto network platform 780. For example operational information that can be stored in memory 786 can comprise, but is not limited to, subscriber information; contracted services; maintenance and service records; Femtocell configuration (e.g., devices served through Femto RAN 790; access control lists, or white lists); service policies and specifications; privacy policies; add-on features; and so forth.

It is noted that Femto network platform 780 and macro network platform 710 can be functionally connected through one or more reference link(s) or reference interface(s). In addition, Femto network platform 780 can be functionally coupled directly (not illustrated) to one or more of external network(s) 740, 750, 760, 765 or 767. Reference link(s) or interface(s) can functionally link at least one of gateway node(s) 784 or server(s) 786 to the one or more external networks 740, 750, 760, 765 or 767.

Figure 8:
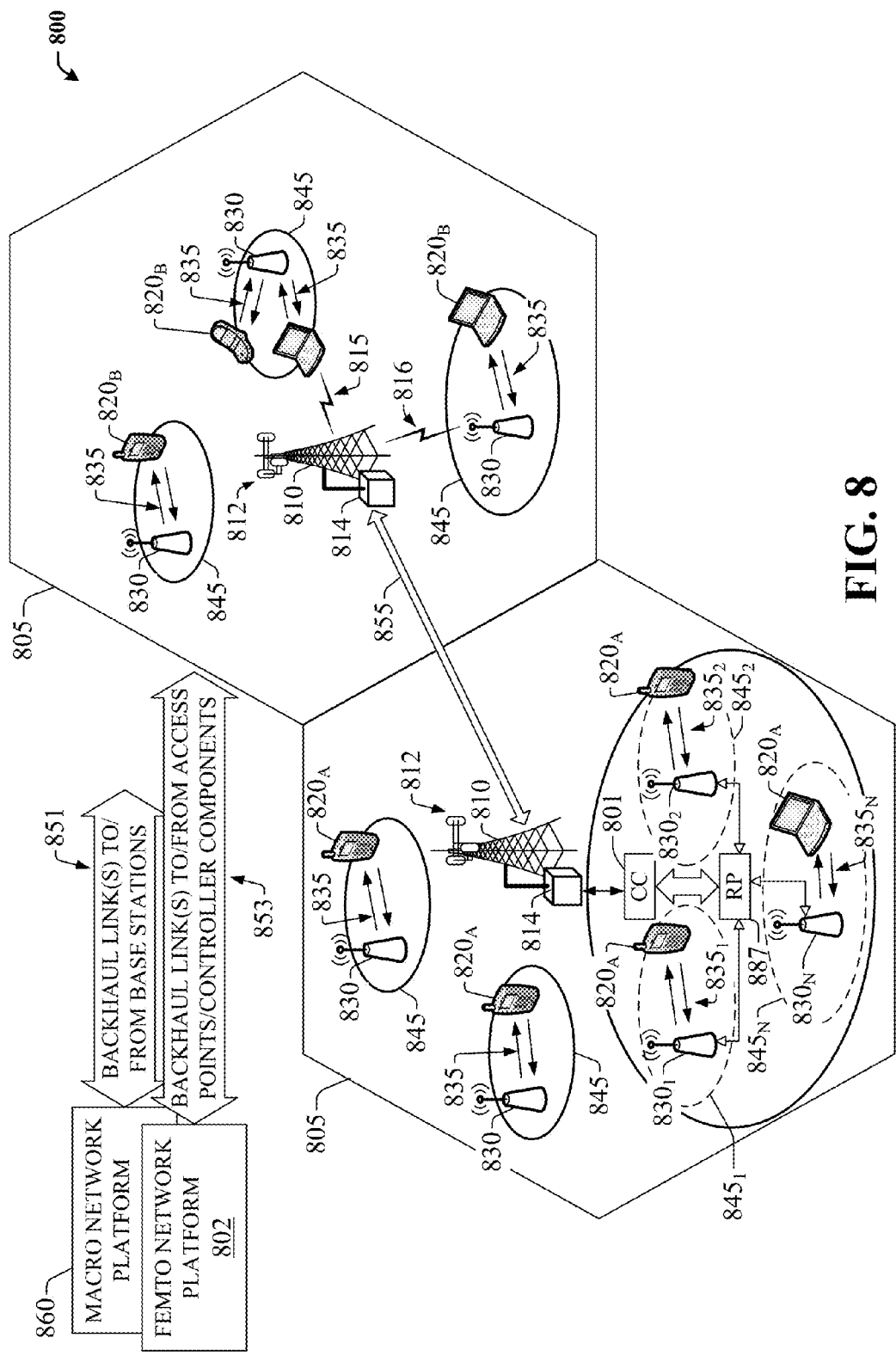
FIG. 8 depicts a second example of a wireless communications environment with components that can be operable to execute some embodiments of this disclosure.

FIG. 8 illustrates a wireless environment that includes macro cells and Femtocells for wireless coverage in accordance with aspects described herein. In wireless environment 805, two areas represent "macro" cell coverage; each macro cell is served by a base station 810. It can be appreciated that macro cell coverage area 805 and base station 810 can include functionality, as more fully described herein, for example, with regard to system 800. Macro coverage is generally intended to serve mobile wireless devices, like UE $820_A$, $820_B$, in outdoors locations. An over-the-air (OTA) wireless link 835 provides such coverage, the wireless link 835 comprises a downlink (DL) and an uplink (UL), and utilizes a predetermined band, licensed or unlicensed, of the radio frequency (RF) spectrum. As an example, UE $820_A$, $820_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 810 communicates via backhaul link(s) 851 with a macro network platform 860, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 860 controls a set of base stations 810 that serve either respective cells or a number of sectors within such cells. Base station 810 comprises radio equipment 814 for operation in one or more radio technologies, and a set of antennas 812 (e.g., smart antennas, microwave antennas, satellite dish(es) . . . ) that can serve one or more sectors within a macro cell 805. It is noted that a set of radio network control node(s), which can be a part of macro network platform 860; a set of base stations (e.g., Node B 810) that serve a set of macro cells 805; electronics, circuitry or components associated with the base stations in the set of base stations; a set of respective OTA wireless links (e.g., links 815 or 816) operated in accordance to a radio technology through the base stations; and backhaul link(s) 855 and 851 form a macro radio access network (RAN). Macro network platform 860 also communicates with other base stations (not shown) that serve other cells (not shown). Backhaul link(s) 851 or 853 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 855 link disparate base stations 810. According to an aspect, backhaul link 853 can connect multiple Femto access points 830 and/or controller components (CC) 801 to the Femto network platform 802. In one example, multiple Femto APs can be connected to a routing platform (RP) 887, which in turn can be connect to a controller component (CC) 801. Typically, the information from UEs $820_A$ can be routed by the RP 887, for example, internally, to another UE $820_A$ connected to a disparate Femto AP connected to the RP 887, or, externally, to the Femto network platform 802 via the CC 801, as discussed in detail supra.

In wireless environment 805, within one or more macro cell(s) 805, a set of Femtocells 845 served by respective Femto access points (APs) 830 can be deployed. It can be appreciated that, aspects of the subject innovation can be geared to Femtocell deployments with substantive Femto AP density, e.g., $10^4$-$10^7$ Femto APs 830 per base station 810. According to an aspect, a set of Femto access points $830_1$-$830_N$, with N a natural number, can be functionally connected to a routing platform 887, which can be functionally coupled to a controller component 801. The controller component 801 can be operationally linked to the Femto network platform 802 by employing backhaul link(s) 853. Accordingly, UE $820_A$ connected to Femto APs $830_1$-$830_N$ can communicate internally within the Femto enterprise via the routing platform (RP) 887 and/or can also communicate with the Femto network platform 802 via the RP 887, controller component 801 and the backhaul link(s) 853. It can be appreciated that although only one Femto enterprise is depicted in FIG. 8, multiple Femto enterprise networks can be deployed within a macro cell 805.

It is noted that while various aspects, features, or advantages described herein have been illustrated through Femto access point(s) and associated Femto coverage, such aspects and features also can be exploited for home access point(s)

(HAPs) that provide wireless coverage through substantially any, or any, disparate telecommunication technologies, such as for example Wi-Fi or picocell telecommunication. Additionally, aspects, features, or advantages of the subject innovation can be exploited in substantially any wireless telecommunication, or radio, technology; for example, Wi-Fi, Worldwide Interoperability for Microwave Access (Wi-MAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

With respect to FIG. 8, in example embodiment 800, base station AP 810 can receive and transmit signal(s) (e.g., traffic and control signals) from and to wireless devices, access terminals, wireless ports and routers, etc., through a set of antennas $812_1$-$812_N$. It should be appreciated that while antennas $812_1$-$812_N$ are a part of communication platform 825, which comprises electronic components and associated circuitry that provides for processing and manipulating of received signal(s) (e.g., a packet flow) and signal(s) (e.g., a broadcast control channel) to be transmitted. In an aspect, communication platform 825 includes a transmitter/receiver (e.g., a transceiver) 866 that can convert signal(s) from analog format to digital format upon reception, and from digital format to analog format upon transmission. In addition, receiver/transmitter 866 can divide a single data stream into multiple, parallel data streams, or perform the reciprocal operation. Coupled to transceiver 866 is a multiplexer/demultiplexer 867 that facilitates manipulation of signal in time and frequency space. Electronic component 867 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 867 can scramble and spread information (e.g., codes) according to substantially any code known in the art; e.g., Hadamard-Walsh codes, Baker codes, Kasami codes, polyphase codes, and so on. A modulator/demodulator 868 is also a part of operational group 825, and can modulate information according to multiple modulation techniques, such as frequency modulation, amplitude modulation (e.g., M-ary quadrature amplitude modulation (QAM), with M a positive integer), phase-shift keying (PSK), and the like.

Figure 9:
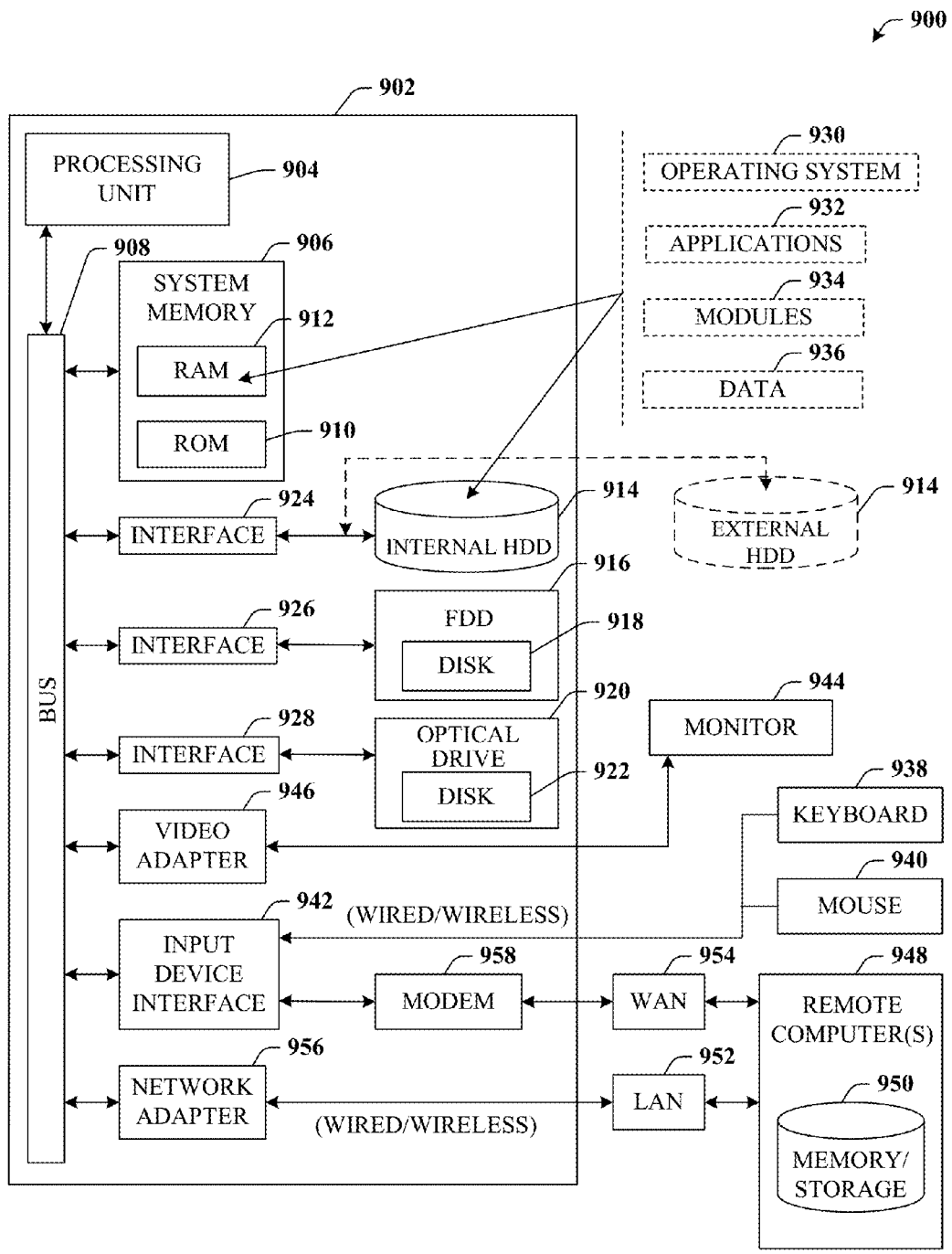
FIG. 9 illustrates a block diagram of an example computer operable to execute one or more embodiments disclosed herein.

Referring now to FIG. 9, there is illustrated a block diagram of an exemplary computer system operable to execute the disclosed architecture. In order to provide additional context for various aspects of the disclosed subject matter, FIG. 9 and the following discussion are intended to provide a brief, general description of a suitable computing environment 900 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Still referring to FIG. 9, the exemplary environment 900 for implementing various aspects of the disclosed subject matter includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory (e.g., ROM 910) such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the disclosed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, a mobile device, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A mobile device, comprising:
  a processor; and
  a memory that stores executable instructions that, when executed by the processor, facilitate performance of operations, comprising:
    receiving, from a first access point device, a broadcast message that has been transmitted within a geographic area associated with the mobile device; and
    in response to a serialization encoding extracted from the broadcast message being determined to satisfy a defined condition representing that the serialization encoding corresponds to a stored serialization encoding of a class of location-based broadcast messages comprising respective information associated with defined geographical regions from which the location-based broadcast messages have been broadcasted, parsing at least a subset of content of the broadcast message into a fielded data object comprising first congestion data representing a first latency associated with the first access point device and second congestion data representing a second latency associated with a second access point device, and
    in response to the first congestion data and the second congestion data being determined, via an application corresponding to the executable instructions, to satisfy a defined condition with respect to the second latency being lower than the first latency, initiating a communication with the second access point device.

2. The mobile device of claim 1, wherein the operations further comprise:
  facilitating execution of an application programming interface of the mobile device in response to the notifying the application of the fielded data object.

3. The mobile device of claim 1, wherein the operations further comprise:
  reading a command included in at least the subset of content of the broadcast message; and
  initiating execution of a component of the mobile device in response to the reading of the command.

4. The mobile device of claim 1, wherein the application has been installed after receipt of program data representing the application.

5. The mobile device of claim 1, wherein the broadcast message comprises encoding information indicating the broadcast message is a cell-broadcast message.

6. The mobile device of claim 5, wherein the cell-broadcast message is received from a network device that broadcast the cell-broadcast message to mobile devices comprising the mobile device.

7. The mobile device of claim 1, wherein the receiving comprises receiving the broadcast message via a radio interface layer defined by a communication protocol corresponding to the mobile device.

8. The mobile device of claim 1, wherein the notifying comprises employing a function of an operating system of the mobile device for facilitation of an access, by the application, of the fielded data object.

9. The mobile device of claim 1, wherein at least the subset of content comprises operating data related to a mobile service-related condition affecting a network device related to the mobile device.

10. The mobile device of claim 9, wherein the network device is a first network device, and wherein the mobile service-related condition comprises a loading metric, a congestion metric, a utilization metric, a throughput metric, or a latency metric affecting the network device or a second network device related to the geographic area.

11. The mobile device of claim 10, wherein at least the subset of content comprises an operating instruction for the mobile device related to the mobile service-related condition.

12. The mobile device of claim 11, wherein the operating instruction comprises a recommendation for the mobile device to register with the second access point device.

13. The mobile device of claim 12, wherein the operations further comprise:
determining, based on the fielded data object, whether to register with the second access point device.

14. The mobile device of claim 1, wherein the application is programmable via an input received by the mobile device for selective performance, based on the fielded data object, of an operation of the operations.

15. A method, comprising:
obtaining, by a system comprising a processor, notification data representing that a message has been wirelessly received by the system; and
in response to a serialization encoding of the message being determined to satisfy a defined similarity to a stored serialization encoding representing a class of location-based broadcast messages comprising information associated with respective locations from which the location-based broadcast messages have been broadcasted,
generating, by the system using the message, a data object comprising congestion information for respective network devices, and
in response to the congestion information being determined to satisfy a defined condition representing a first latency associated with a first network device of the respective network devices is greater than a second latency associated with the second network device of the respective network devices,
initiating, by the system, a transfer of a communication of the system from a first access point device associated with the first network device to a second access point device associated with the second network device.

16. The method of claim 15, further comprising:
assigning, by the system, a subset of information of the data object as a public class that is accessible to a public class application of the system, wherein the initiating comprises initiating the transfer via the public class application.

17. The method of claim 15, wherein the initiating comprises initiating the transfer of the communication of the system utilizing a public class of an application programming interface.

18. The method of claim 15, further comprising:
limiting, by the system, access to the data object based on a result of a verification of a permission for the access.

19. A system, comprising:
a processor; and
a memory that stores executable instructions that, when executed by the processor, facilitate performance of operations, comprising:
determining that a message has been received by the system within a defined region corresponding to the system; and
in response to a serialization encoding of the message being determined to correspond to a type of location-based broadcast message comprising information associated with a defined geographical region from which the location-based broadcast message has been broadcasted, transforming a subset of the message into a data object, and
in response to determining, via an application of the system, that network information that has been included within the data object satisfies a defined condition with respect to a first latency associated with a first network device being greater than a second latency associated with a second network device, initiating a transfer of a communication of the system from a first access point device associated with the first network device to a second access point device associated with the second network device.

20. The system of claim 19, wherein a class of applications of the system comprising the application is associated with a user identity, and wherein the operations further comprise:
based on an authentication of the user identity, enabling a permission-based access to the data object for the class of applications.

* * * * *